US008622664B2

(12) United States Patent
Lanser

(10) Patent No.: US 8,622,664 B2
(45) Date of Patent: Jan. 7, 2014

(54) HAND HELD PORTABLE DRILL GUIDE ENABLING SINGLE HANDED FIELD SETUP AND HAVING RELEASABLE DRILL GRIPPING SECUREMENT

(76) Inventor: Jerry L. Lanser, Longmont, CO (US)

( * ) Notice: Subject to any disclaimer, the term of this patent is extended or adjusted under 35 U.S.C. 154(b) by 1191 days.

(21) Appl. No.: 12/462,192

(22) Filed: Jul. 31, 2009

(65) Prior Publication Data

US 2011/0027029 A1 Feb. 3, 2011

(51) Int. Cl.
*B23B 47/00* (2006.01)

(52) U.S. Cl.
USPC .......... 408/92

(58) Field of Classification Search
USPC .......... 408/92, 115 R, 1 R
See application file for complete search history.

(56) References Cited

U.S. PATENT DOCUMENTS

| | | | |
|---|---|---|---|
| 641,922 | A | 1/1900 | Baumgardner |
| 1,184,829 | A | 5/1916 | Crist |
| 2,373,785 | A | 4/1945 | Seaboly |
| 2,667,092 | A | 1/1954 | Shaffer |
| 2,695,525 | A | 11/1954 | Butenhoff |
| 2,827,807 | A | 3/1958 | Meyer |
| 2,947,205 | A | 8/1960 | Wilson |
| 3,248,973 | A | 5/1966 | Meyer |
| 3,538,794 | A | 11/1970 | Grundmeyer |
| 3,698,827 | A | 10/1972 | Salfer |
| 3,741,670 | A | 6/1973 | Wood |
| 3,834,828 | A | 9/1974 | Kikuchi |
| 3,957,387 | A | 5/1976 | Evertz et al. |
| 4,235,565 | A | 11/1980 | Albano |
| 4,585,376 | A | 4/1986 | Davenport et al. |
| 4,823,443 | A | 4/1989 | Waters |
| 5,051,044 | A | 9/1991 | Allen |
| 5,890,851 | A | 4/1999 | Hamilton |
| 2004/0202516 | A1 | 10/2004 | Lanser |

*Primary Examiner* — David Bryant
*Assistant Examiner* — Moshe Wilensky
(74) *Attorney, Agent, or Firm* — Harold A. Burdick

(57) ABSTRACT

A portable drill guide and method are disclosed for use primarily with hand held power drills having a pistol-type hand grip. The drill guide includes a mounting assembly and an operational guide assembly, the mounting assembly having a tool support bracket with a clamping band and resilient gripping limbs. The operational guide assembly includes a support arm bracket having the tool support bracket connected therewith and a support arm extending therefrom at an angle normal to the mounting assembly, a pair of interface guide posts with retainers, and an interface tensioning mechanism including a slotted two level shaft. An interface, a sufficient length of durable webbing or strap for example, is engagable around a workpiece and the guide posts beneath the retainers, and is operably associable with the tensioning mechanism.

14 Claims, 4 Drawing Sheets

HAND HELD PORTABLE DRILL GUIDE ENABLING SINGLE HANDED FIELD SETUP AND HAVING RELEASABLE DRILL GRIPPING SECUREMENT

FIELD OF THE INVENTION

This invention relates to portable hand tool operation, and, more particularly, relates to portable guides and presses for hand held drill motors.

BACKGROUND OF THE INVENTION

Hand held power drills are widely utilized in the field for various construction, repair and maintenance operations. The portability of such tools has made them an efficient and effective choice for site-based operations. Such tools, however, are inherently unstable, imprecise and difficult to employ for some operations.

For example, hand held drill motors having pistol-type hand grips are difficult to use on slick or uneven surfaces, having a tendency to "walk" or slip from the desired drilling location upon initial motor start-up. Moreover, such drill motors tend toward binding of the bit in the workpiece, especially at difficult or awkward attack angles. Finally, at some drilling site locations, maintenance of sufficient working force (pressure applied at the drill bit to the workpiece) is difficult due to workpiece location.

In an effort to address these shortcomings, a number of apparatus have heretofore been suggested and/or utilized for stabilizing the tool and/or aiding in application of drilling pressure at the bit (see, for example, U.S. Patent Documents US2004/0202516, U.S. Pat. Nos. 641,922, 1,184,829, 2,667,092, 2,695,525, 2,827,807, 2,947,205, 3,248,973, 3,538,794, 3,698,827, 3,741,670, 3,834,828, 3,957,387, 4,168,926, 5051,044, and 5,890,851). Such heretofore known apparatus have, however, met with limited acceptance, due at least in part to lack of sufficient work site adaptability, for example the ability to operate independent of attitude of tool operation and/or simplification of operation of various attachments, guides and mounts not to mention the tool itself in the field. Operational stability, ease of use, and/or ability to operate mounts and attachments with one hand while operating the tool with the other should be attended to in further improving such apparatus.

SUMMARY OF THE INVENTION

This invention provides a portable drill guide for stabilizing and applying continuing pressure during operation of a portable hand drill motor independent of attitude of application of the drill motor to the workpiece. The drill guide enables single handed field setup and has a readily releasable drill motor gripping securement, is adaptable to work site limitations, accommodates operation independent of attitude of drill operation, and simplifies operation of its various attachments, guides and mounts as well as drill manipulation during use in the field. The guide improves drill motor operational stability by limiting occurrences of drill bit slipping, walking and binding at the work piece during use.

The portable drill guide for use with a hand held drill motor includes a mounting assembly having a mounting bracket spaced resilient gripping limbs and a securing band maintained around the limbs. The band includes a tightness varying mechanism and may be readily replaceable/disposable in nature. An operational guide assembly is connected with the mounting assembly and includes a support arm bracket with first and second spaced guide posts connected with the support arm bracket. A tensioning mechanism is mounted at the support arm bracket with a slotted shaft thereof rotatable through the support arm bracket. The guide posts are located between the shaft of the tensioning mechanism and the limbs of the mounting assembly, the shaft and the limbs aligned centrally relative to the spaced guide posts. A workpiece engageble interface such as a strap is maintainable around the guide posts and at the slotted shaft of the tensioning mechanism.

Each of the guide posts includes a retainer adjacent thereto for receiving the interface therebeneath adjacent to the guideposts. The slotted shaft includes an extended shaft half for ease of interface insertion thereinto. The support arm bracket has a support arm extending therefrom, and the mounting bracket includes a rear wall attached to the support arm bracket and having the spaced resilient limbs thereat. Each of the first and second limbs includes an arcuate limb section, the limb sections contoured toward one another. The guide posts are preferably positioned at opposite sides of the rear wall of the drill motor support bracket. A ratchet assembly is mounted at the support arm bracket for tensioning the strap.

It is therefore an object of this invention to provide a portable drill guide for stabilizing and applying continuing pressure during operation of a portable drill motor that enables single handed field setup and readily releasable drill motor securement.

It is another object of this invention to provide a portable drill guide that simplifies operation of its various attachments, guides and mounts as well as drill manipulation during use in the field.

It is another object of this invention to provide a drill guide for use with a portable hand drill that is useful in the field independent of work site limitations and/or attitude of application of the drill motor to the workpiece, is simple and stable to operate, and is configured to help limit occurrences of drill bit walking, slipping and binding at the work piece.

It is still another object of this invention to provide an attitude independent portable drill guide for use with a hand held drill motor, the drill guide including a mounting assembly having spaced resilient gripping limbs and a securing band maintained around the limbs, an operational guide assembly connected with the mounting assembly and including a support arm bracket, first and second spaced guide posts connected with the support arm bracket, and a tensioning mechanism mounted at the support arm bracket with a slotted shaft thereof rotatably maintained therethrough, the guide posts located between the shaft of the tensioning mechanism and the limbs of the mounting assembly, the shaft and the limbs aligned centrally relative to the spaced guide posts, and a workpiece engageble interface maintainable around the guide posts and at the slotted shaft of the tensioning mechanism.

It is still another object of this invention to provide a hand held drill guide for use with a hand held drill motor with a pistol-type grip extending from a main body, the drill guide including a support arm bracket having a support arm extending therefrom, a drill motor support bracket including a rear wall attached to the support arm bracket and having first and second spaced resilient limbs configured to receive the drill motor main body thereat, the first and second limbs each including an arcuate limb section, the limb sections contoured toward one another, a band at the limbs including a tightness varying mechanism, first and second spaced guide posts connected with the support arm bracket and positioned thereat at opposite sides of the rear wall of the drill motor support bracket, a ratchet assembly mounted at the support arm bracket, and a workpiece engaging strap maintainable around the guide posts and operationally associable with the ratchet assembly.

With these and other objects in view, which will become apparent to one skilled in the art as the description proceeds, this invention resides in the novel construction, combination, and arrangement of parts substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
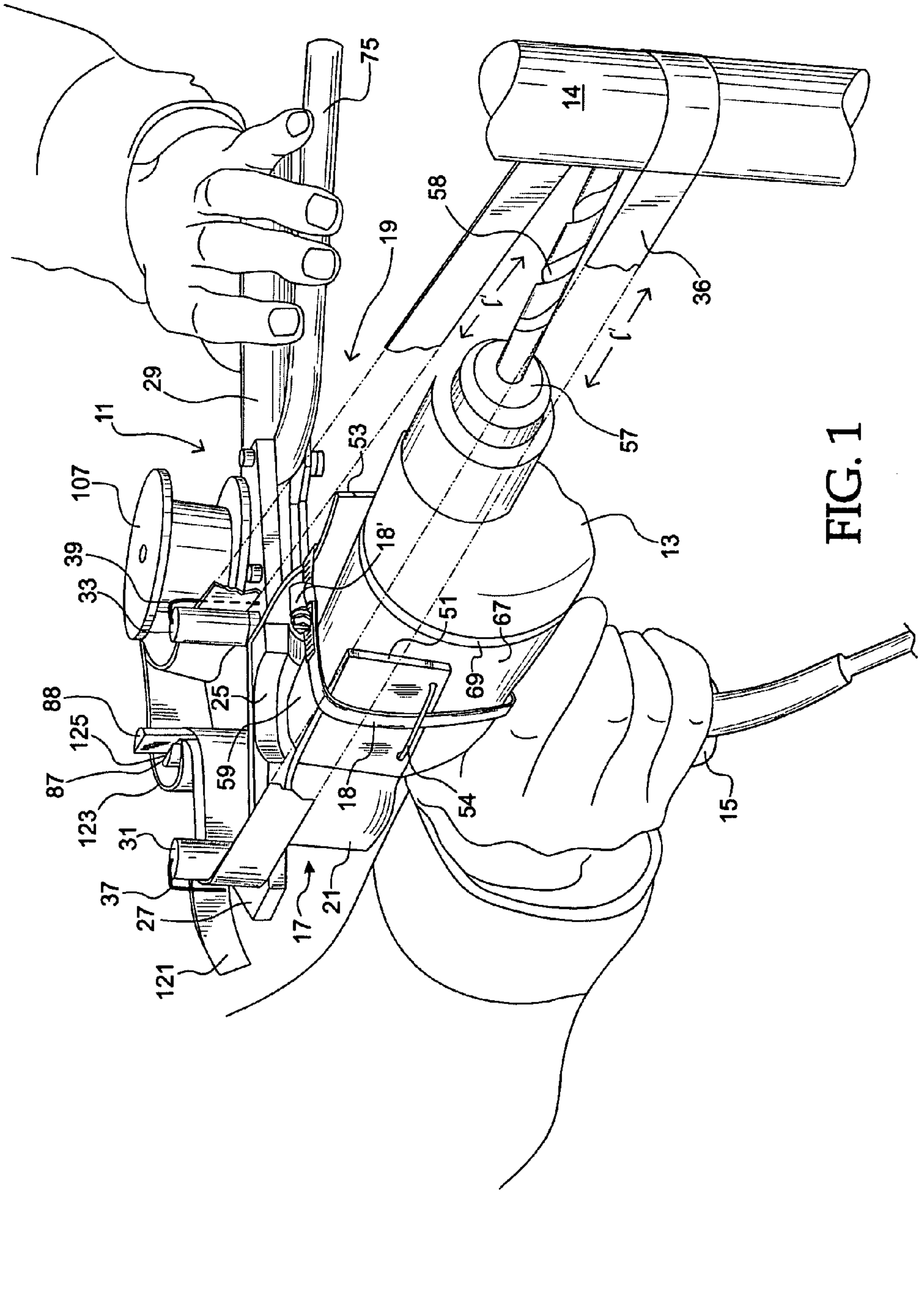
FIG. 1 is a perspective view of the portable drill guide of this invention in use with a portable hand held power tool (a drill motor)
Figure 2:
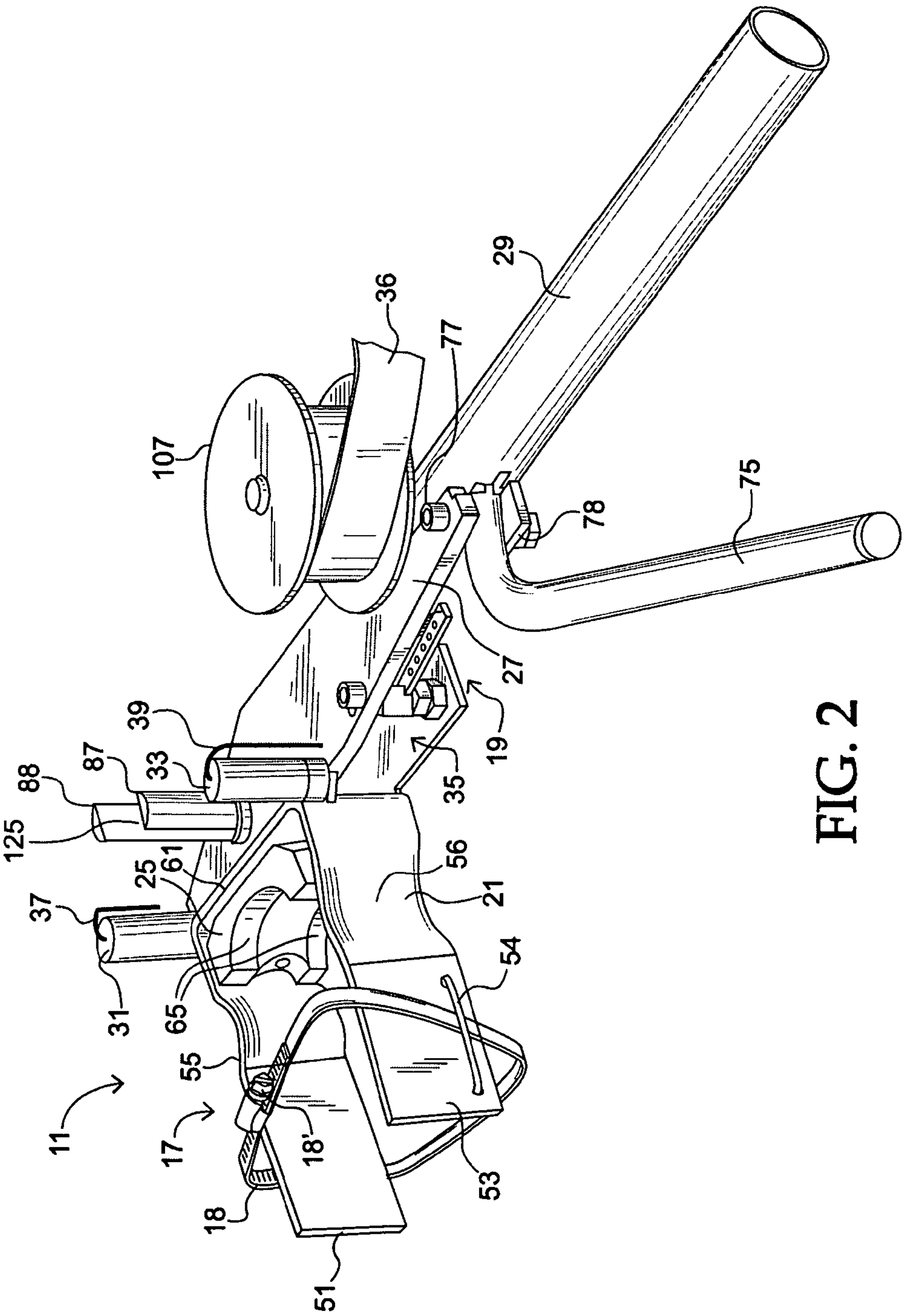
FIG. 2 is another perspective view of the drill guide of FIG. 1.
Figure 3:
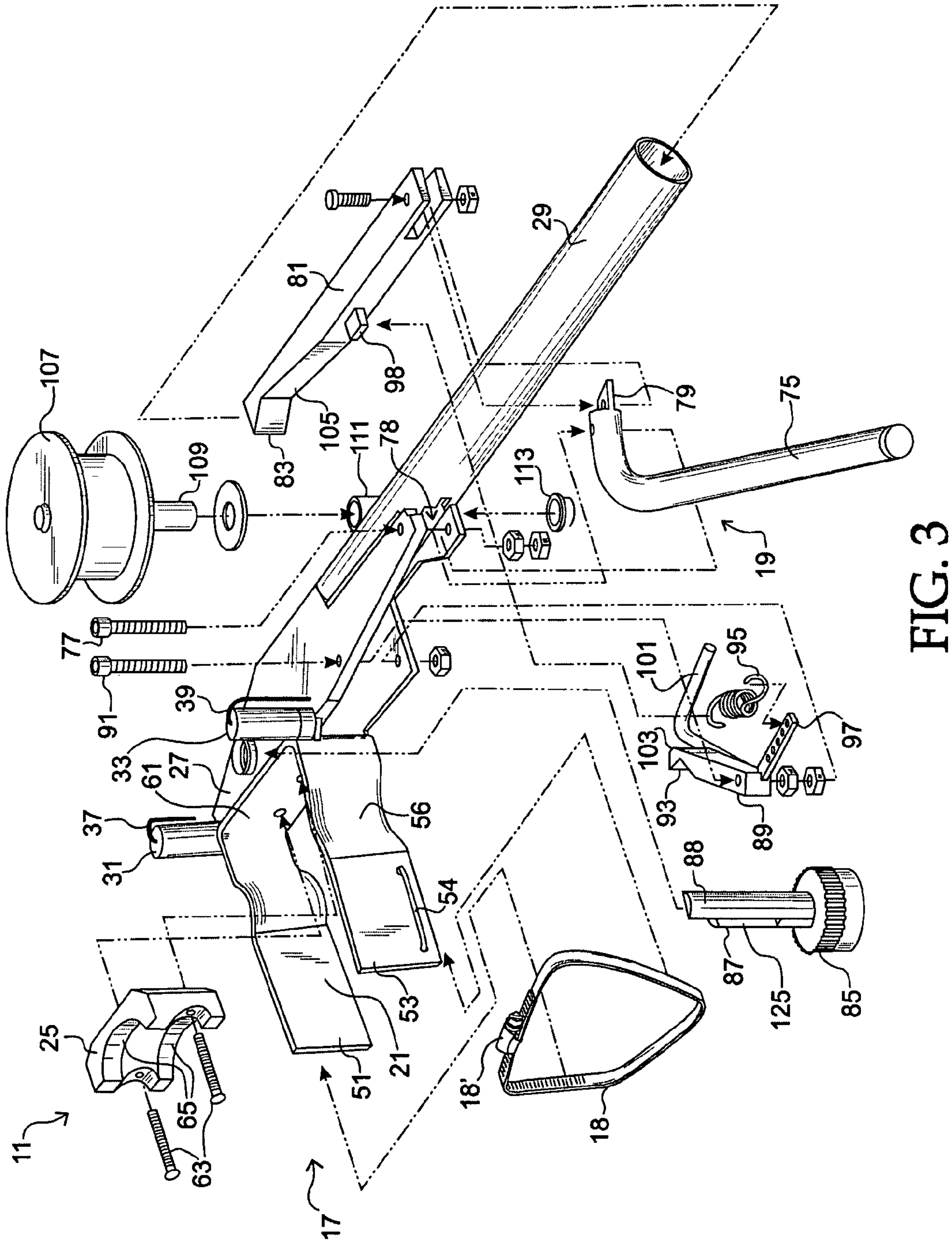
FIG. 3 is an exploded view of the portable drill guide of FIG. 1.
Figure 4:
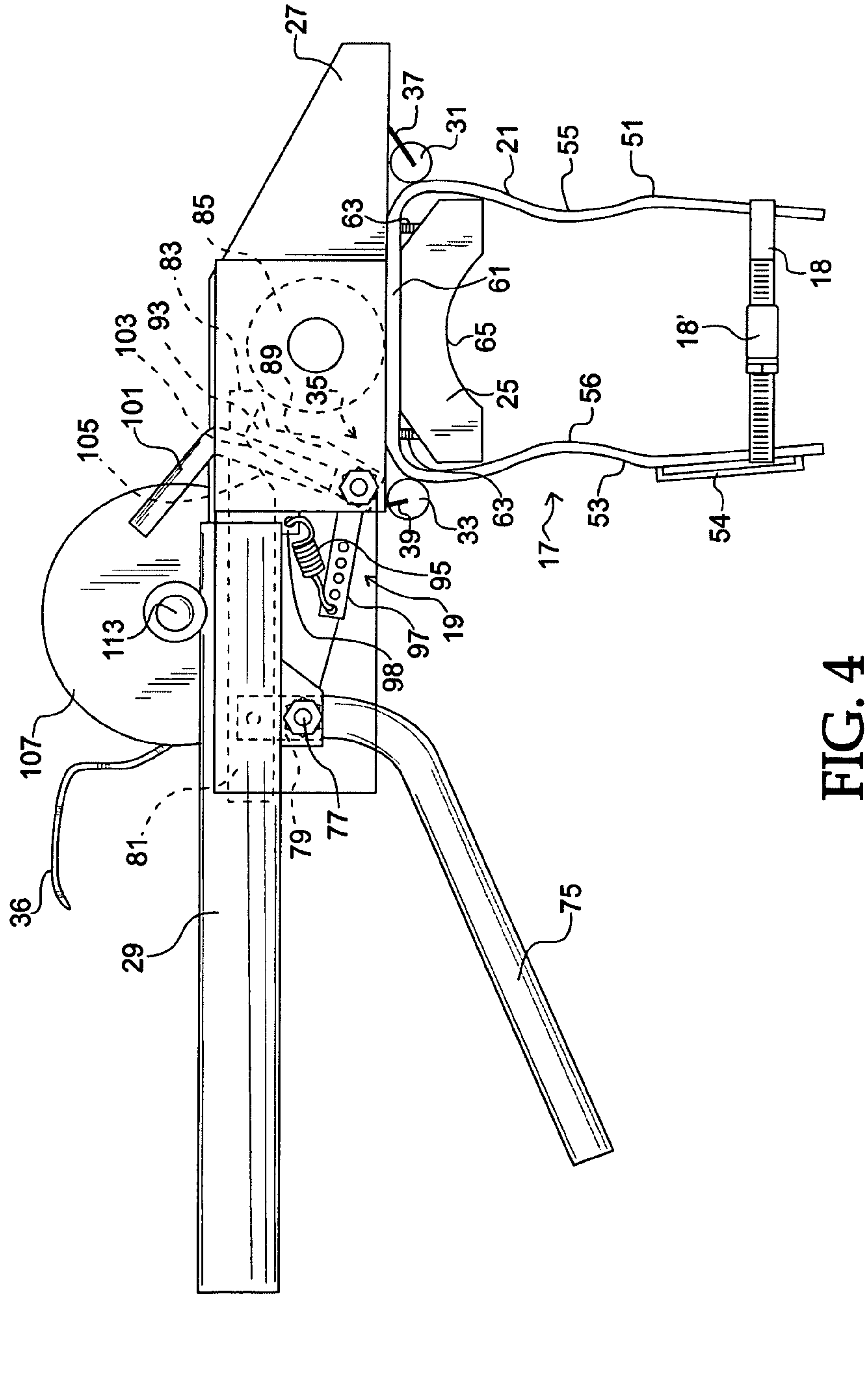
FIG. 4 is a bottom plan view of the drill guide of FIG. 1 with ghosted sections.

FIG. 1 illustrates portable hand held drill guide 11 in use with a power tool 13, a hand held drill (sometimes referred to as a drill motor), boring a hole in a workpiece (pipe 14). Drill guide 11 is designed for use primarily with hand held power tools, and especially electric or pneumatic portable drill motors having a pistol-type hand grip 15 including an on/off switch (or trigger, not shown).

As shown in FIGS. 1 through 4, drill guide 11 includes mounting assembly 17 utilizing a flexible and disposable/replaceable band 18 and operational guide assembly 19. Mounting assembly 17 includes power drill support bracket 21 and resilient support 25. Operational guide assembly 19 includes support arm bracket 27 having drill support bracket 21 connected therewith and having support arm 29 extending therefrom at an angle normal to mounting assembly 17, interface guide posts 31 and 33, and interface tensioning mechanism 35. Interface 36, a sufficient length of durable webbing or strap for example, is engagable around a workpiece 14 and guides 31 and 33 and is operably associable with tensioning mechanism 35 as discussed hereinafter. Interface 36, when a strap is used as shown herein, is preferably of nylon or other tear resistant and durable material. Strap retainers 37 and 39 extend from interface guide posts 31 and 33, respectively, for receipt of interface 36 therebeneath between a respective retainer and its adjacent interface guide post. Strap retainer 37 extends only part of the length of post 31 defining a slot open at one end and thus accommodating one handed insertion of strap interface 36 therebeneath during field application. Retainer 39 extends the full length of post 33 (and may be secured at an opening through bracket 27) defining a slot closed at both ends for retention of interface 36 through.

Converging securement limbs 51 and 53 of drill support bracket 21 are angled toward one another and include retainer bar or bars 54. Either one or two bars 54 at the exterior of either or both limbs 51 (FIG. 1) or 53 (FIGS. 2 through 4) can be utilized to retain band 18 adjacent to bracket 21. Each of limbs 51 and 53 includes a drill motor contacting contoured sections 55 and 56, respectively, these arcuate limb sections bulging toward one another to improve gripping securement of the drill motor and ready release thereof due to spring like operation of the thus configured limbs. Bracket 21, and particularly limbs 51 and 53 thereof, is made of resilient material (metal or carbon plastic, for example).

As shown in FIG. 1, drill chuck 57 (releasably receiving drill bit 58) of drill motor 13 is releasably secured with a selected orientation relative to workpiece 14 utilizing band 18 (by loosening and tightening tensioner screw mechanism 18' provided with a known variety of slotted band mechanism, for example—other tensioning mechanisms being usable), and heel 59 at hand grip 15 of drill motor 13 is maneuvered into position at resilient support 25 (preferably made of a relatively hard, but yieldable rubber or the like secured to bracket rear wall 61 of drill support bracket 21, for example by screws 63 or the like), with heel 59 resting in conforming surface 65 thereof. Drill motor 13 is clamped between band 18 (abutting side body 67 of drill motor housing 69) and rear wall 61 of drill support bracket 21, heel 59 of drill motor 13 being pressed into resilient support 25. Limbs 51 and 53 are urged toward tight contact with motor body 67 by tightening of band 18, particularly at contoured sections 55 and 56. Thus motor 13 is securely gripped support 25 thereby holding the drill motor secure against movement in all dimensions (up, down, sided to side and forward and rearward).

Tensioning mechanism 35 as shown herein is a ratchet assembly. While ratchet assembly 35 is shown, any other means for tensioning the strap known in the art may be utilized. Ratchet assembly 35 may be any common ratchet type assembly adaptable to the use indicated. As shown herein, the assembly includes ratchet handle 75 pivotable toward support arm 29 about pivot pin 77 held at mount 78 formed at support arm bracket/support arm 27/29 junction (support arm 29 preferably being a made of rigid hollow tubing). Ratchet handle end 79 is pivotably mounted at drive bar 81, pawl 83 at the opposite end of drive bar 81 being engageable in the teeth of ratchet gear 85 rotatably held in journals (not shown) in support arm bracket 27. As may be appreciated, this arrangement allows movement of ratchet gear 85 and thus slotted take-up shaft 87 connected therewith. Slotted shaft 87 includes extended shaft half 88 for ease of interface insertion into the slot (the ability to easily achieve one handed strap interface 86 manipulation in the field is needed).

Latch 89 is pivotably mounted at pin 91 to support arm bracket 21. Pawl 93 of latch 89 engages teeth of gear 85 limiting gear rotation to a single direction when in the engaging position. Spring 95 is attached between a selected location at latch extension 97 and ear 98 of drive bar 81 to maintain bias of latch 89 toward gear 85 and bias drive bar 81 into engagement with gear 85. Release 101 is attached to latch 89 for movement of latch 89 against its bias. When moved, release 101 brings latch pawl 93 out of engagement with the teeth of gear 85 and cam surface 103 of latch 89 into contact with cam guide surface 105 of drive bar 81 thus disengaging pawl 83 of bar 81 from the teeth of gear 85 and thereby allowing free rotation of gear 85 and shaft 87.

Interface strap storage reel 107 normally holds one end of interface strap 36 and is freely rotatable on its axle 109 through journal mount 111 at support arm 29, maintained thereat by press fit retainer cap 113.

In use as shown in FIG. 1, after drill motor 13 is mounted in mounting assembly 17, workpiece/drill motor interface strap 36 is inserted in the slot defined by retainer 39 and post 33 and bit 58 is located at the desired drilling location at workpiece 14. Interface 36 is then wrapped around the workpiece (for example, the pipe 14 shown in FIG. 1) and around the outside of guide post 31 beneath retainer 37. Since guide posts 31/33 are located between the shaft 87 and limbs 51/53, with shaft 87 and limbs 51/53 aligned centrally relative to guide posts 31/33, rear support wall 61 of drill support bracket 21 is centered between posts 31/33 with shaft 87 centered thereat so that interface strap 36 is directly tensioned relative to the primary direction of drill motor 13 operation toward and away from the workpiece, with work force applied substantially evenly from both sides of the drill motor. Free end 121 and intermediate portion 123 (see FIG. 1) of strap 36 are then positioned in slot 125 of tensioning shaft 87.

The operator holds grip 15 of drill motor 13 with one hand to operate the drill, while holding support arm 29 and ratchet handle 75 of drill guide 11 with the other hand to operate tensioning mechanism 35. When the operator squeezes handle 75 toward arm 29, operation of ratchet assembly 35 and rotation of shaft 87 tensions strap 36 by wrapping strap 36 around shaft 87 decreasing the lengths (l) and (l') of strap 36 between guide posts 31 and 33, respectively, and workpiece 14 equally (thereby maintaining substantially constant lateral pressure at each side of drill motor 13 at tensioning continues) and securing strap 36 in slot 125 of shaft 87 when taut.

As ratcheting continues, drill bit 57 in drill motor 24 is drawn into contact with workpiece 14 in a relatively constant directional orientation relative to the workpiece since mounting assembly 17 and operational guide assembly 19 are relatively aligned and operate together to apply work force substantially equally from opposite sides of drill motor 13, and with drill motor 13 stabilized at both the front and rear of the drill motor in mounting assembly. The maintenance of such relatively constant directional orientation helps alleviate slipping and binding common to such operations.

The operator continues to operate ratchet handle 75 as necessary during drilling to maintain stability and substantially constant pressure between workpiece 14 and drill bit 57 as the bit enters the workpiece. When drilling is complete, the operator depresses latch release 101 at ratchet assembly 35 allowing ratchet gear 85 and thus shaft 87 to rotate in the opposite direction thereby releasing tension on interface 36 allowing it to be removed from around workpiece 14. When not in use, band 18 is loosened so that resilient gripping limbs 51 and 53 readily release drill motor 13 due to spring like operation of support bracket 21 encouraged by contoured sections 55 and 56. Drill motor 13 is thus readily made available for use or storage separately from portable hand held drill guide 11. Interface strap 36 may be wound for storage at reel 107 when drill guide 11 is not in use.

What is claimed is:

1. An attitude independent portable drill guide for use with a hand held drill motor, said drill guide comprising:

a mounting assembly including spaced resilient gripping limbs and a securing band maintained around said limbs;

an operational guide assembly connected with said mounting assembly and including a support arm bracket, first and second spaced guide posts connected with said support arm bracket, and a tensioning mechanism mounted at said support arm bracket, said tensioning mechanism including a slotted shaft rotatably maintained therethrough, said slotted shaft having an extended shaft half, said guide posts located between said shaft of said tensioning mechanism and said limbs of said mounting assembly, said shaft and said limbs aligned centrally relative to said spaced guide posts; and a workpiece engageble interface maintainable around said guide posts and at said slotted shaft of said tensioning mechanism, whereby said extended shaft half is provided for ease of interface insertion at said slotted shaft.

2. The portable drill guide of claim 1 wherein said guide posts each include a retainer adjacent thereto for receiving said interface therebeneath adjacent to said guide posts.

3. The portable drill guide of claim 2 wherein said retainer at said second guide post defines a slot closed at both ends and said retainer at said first guide post defines a slot open at one end.

4. The portable drill guide of claim 1 wherein at least one of said limbs includes a retainer bar for receiving and retaining said securing band thereat.

5. The portable drill guide of claim 1 wherein said limbs of said mounting assembly each include arcuate limb sections contoured toward one another to improve gripping securement of the drill motor and ready release thereof due to spring like operation of said limbs thus configured.

6. A hand held drill guide for use with a hand held drill motor with a pistol-type grip extending from a main body, said drill guide comprising:

a support arm bracket having a support arm extending therefrom;

a drill motor support bracket including a rear wall attached to said support arm bracket and having first and second spaced resilient limbs configured to receive the drill motor main body thereat, said first and second limbs each including an arcuate limb section, said limb sections contoured toward one another;

a band at said limbs including a tightness varying mechanism;

first and second spaced guide posts connected with said support arm bracket and positioned thereat at opposite sides of said rear wall of said drill motor support bracket;

a ratchet assembly mounted at said support arm bracket, said ratchet assembly including a slotted shaft rotatably maintained through said support arm bracket and having an extended shaft half for ease of insertion thereinto, said shaft and said limbs aligned centrally relative to said spaced guide posts; and a workpiece engaging strap maintainable around said guide posts and insertable at said slotted shaft of said ratchet assembly.

7. The drill guide of claim 6 further comprising a rotatable storage reel holding one end of said strap and freely rotatable at a mount at one of said support arm bracket and said support arm.

8. The drill guide of claim 6 wherein said ratchet assembly includes a ratchet handle operative in association with said support arm by a user of the tool to tension said strap.

9. The drill guide of claim 8 wherein said shaft is operable by manipulation of said ratchet handle, said shaft holding said strap at one end of said strap and at an intermediate location along said strap spaced from said one end.

10. The drill guide of claim 6 wherein said drill motor support bracket includes a yieldable member maintained at said rear wall.

11. The drill guide of claim 10 wherein said yieldable member has a conforming surface adapted to receive and be caused to grip a rear portion of the pistol-type grip of the drill motor positioned thereat.

12. The drill guide of claim 6 wherein said guide posts each include a slot defining retainer adjacent thereto for receiving said strap.

13. An attitude independent portable drill guide for use with a hand held drill motor, said drill guide comprising:

a mounting assembly including spaced resilient gripping limbs and a securing band maintained around said limbs;

an operational guide assembly connected with said mounting assembly and including a support arm bracket, first and second spaced guide posts connected with said support arm bracket and each including a retainer adjacent thereto, wherein said retainer at said second guide post defines a slot closed at both ends and said retainer at said first guide post defines a slot open at one end, and a tensioning mechanism mounted at said support arm bracket with a slotted shaft thereof rotatably maintained therethrough, said guide posts located between said shaft of said tensioning mechanism and said limbs of said mounting assembly, said shaft and said limbs aligned centrally relative to said spaced guide posts; and a workpiece engageble interface receivable beneath said retainer adjacent to said guide posts so that said interface is maintainable around said guide posts and at said slotted shaft of said tensioning mechanism.

14. The portable drill guide of claim 1 wherein said slotted shaft includes an extended shaft half for ease of interface insertion thereinto.

* * * * *